United States Patent
Germain (10) Patent No.: US 7,900,765 B2
(45) Date of Patent: Mar. 8, 2011

(54) GROUPING METHOD AND STATION FOR A PALLETIZER

(75) Inventor: Dominique Germain, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 344 days.

(21) Appl. No.: 12/160,850

(22) PCT Filed: Jan. 15, 2007

(86) PCT No.: PCT/FR2007/000063
§ 371 (c)(1),
(2), (4) Date: Jul. 14, 2008

(87) PCT Pub. No.: WO2007/080332
PCT Pub. Date: Jul. 19, 2007

(65) Prior Publication Data
US 2010/0170767 A1    Jul. 8, 2010

(30) Foreign Application Priority Data
Jan. 16, 2006  (FR) ...................................... 06 00338

(51) Int. Cl.
*B65G 47/30* (2006.01)
(52) U.S. Cl. .................. 198/418.5; 198/419.3; 198/429; 198/456
(58) Field of Classification Search .............. 198/418.5, 198/419.3, 429, 430, 456, 457.01, 598
See application file for complete search history.

(56) References Cited

U.S. PATENT DOCUMENTS

| 2,679,310 | A | * | 5/1954 | Lunn ............................. 198/430 |
| 2,793,771 | A | * | 5/1957 | Ochs ............................. 198/429 |
| 3,039,248 | A | * | 6/1962 | Jones ............................. 53/152 |
| 3,225,891 | A | * | 12/1965 | Hickin et al. .................. 198/429 |
| 3,388,815 | A | * | 6/1968 | Lingl ............................. 198/430 |
| 6,164,045 | A |   | 12/2000 | Focke et al. |
| 6,209,706 | B1 | * | 4/2001 | Tod, Jr. ......................... 198/418 |
| 6,547,058 | B2 | * | 4/2003 | Ouellette ................... 198/418.5 |
| 6,547,059 | B2 | * | 4/2003 | Ouellette ...................... 198/430 |

FOREIGN PATENT DOCUMENTS

DE    25 59 270 A1    7/1977
FR    2 758 131 A1    7/1978

* cited by examiner

Primary Examiner — James R Bidwell
(74) Attorney, Agent, or Firm — Sughrue Mion, PLLC (57) ABSTRACT

Method of placing products on the floor of a grouping station (3), in aisles (5), to form a batch of products to be palletized, including withdrawing guide walls (6) forming the aisles (5) to an inactive position; moving the batch towards the palletization station (11); repositioning the guide walls (6) into an active position; and re-placing a mechanism (10) for moving the rows into their starting position by turning them about the guide walls (6). The station (3) for grouping products (2) is arranged between the selection station of the receiving line (1) and the table (12) of the palletization station (11) and includes: motorized conveyor (4); guide walls (6); thrust devices (40) for conveying the batch onto the table (12); a mechanism for withdrawing the guide walls (6); and a mechanism for imparting to the thrust devices (40) a turning movement about the guide walls (6).

10 Claims, 6 Drawing Sheets

GROUPING METHOD AND STATION FOR A PALLETIZER

FIELD OF INVENTION

The present invention relates to a complex method of grouping products, in the form of batches, and transferring these batches with a view to a palletization, for example.

It also relates to the installation which allows the implementation of this method and in particular the station grouping the products and transferring the batch of grouped products.

BACKGROUND

An installation of this type is represented in particular in the document DE 25 59 270, for grouping boxes and transferring the batch.

In case of certain types of products, whose contact surface with the conveyor is relatively small, there are often incidents on these installations.

Thus, for example, products of the bottle-pack type can cause problems when it comes to allowing a wholly automated palletization.

In the case of packs comprised of four bottles, the contact surface of the base with the conveyor is relatively small; this particular feature makes the pack extremely unstable and is the cause of many incidents on the palletization line.

When, additionally, the pack is comprised of bottles, the base of which is formed of several supporting points, commonly called "petaloid base", it tends to "dance" on conveyors and in particular on roller conveyors; for this reason it can assume positions which are totally unsuitable for carrying out a grouping with other packs and it is not uncommon for the attempt at grouping to culminate in a crude jumble.

These grouping and palletization problems are encountered with the majority of products which are not boxed such as, for example in a truly parallelepipedic cardboard box of the American box type.

Consequently, the palletization rates for these products with small dimensions are relatively modest. Their instability makes them most unsuitable for the high speeds and distances covered where these products are free, such as is the case at a preparation and grouping station.

BRIEF DESCRIPTION OF THE INVENTION

The present invention proposes a grouping and transfer method for these particular products which allows palletization speeds to be improved while guaranteeing the formation of regular layers with well-positioned products, and, consequently, the formation of a well-balanced pallet.

The installation represented in the document DE 25 59 270 cited above also allows a very precise grouping of products to be achieved. This precision is firstly easier to achieve with products of the tinned food type, but rests on solutions which are clearly different from those which are adopted by the invention.

The boxes are grouped on an inter-layer sheet which also acts as a platform transporting the batch during its movement. The presence of this platform is indispensable taking account of the pusher system which requires a substantial space between the grouping table and the conveyor which takes charge of this platform.

The method and the installation according to the invention make it possible to dispense with an inter-layer sheet at the grouping station; this grouping station contains a base which is formed of a standard conveyor system, of the motorized rollers type, on which the products are introduced directly.

This simple design allows high speeds of the order of two hundred packs per minute to be achieved, for packs comprised of four thermoplastic bottles, the base of which is special with a multiplicity of contact points, i.e., for products known to be very unstable.

The installation according to the invention also has the advantage of being able to be placed directly at the outlet from the pallet-wrapping machine and thus simplifying in a remarkable way the lay-out of the manufacture, packaging and presentation and palletization chain.

The method according to the invention comprises, generally—introducing the products directly on the base of the grouping and transfer station, in separate aisles, the width of which corresponds to that of said products in order to form the batch of products to be palletized, —vertically retracting the guide structures which form said aisles, to an inactive position, as soon as said batch is formed, —transferring said batch to the pick-up and/or boxing or palletization station by movement means which pass under said guide structures, —repositioning the guide structures in an active position as soon as said movement means have passed and, —raising the latter in order to bring them into their starting position, passing above said guide structures in a sort of turning movement around these latter.

The invention also relates to the installation and in particular the grouping and transfer station which allows the implementation of the method detailed above.

This grouping station is arranged between the selection station of the arrival line of the products and the table of the pick-up station, which grouping station comprises:

a base constituted by a motorized conveyor for carrying the products from the entrance to this grouping station as far the stop system situated at its downstream end, structures forming aisles for guiding said products on said conveyor and for positioning them in several parallel rows, —means of moving the batch of products thus formed and bringing it onto the table of the pick-up station, —means of retracting said guide structures, placing them above the level of said means of moving the batch, means of allowing said movement means to return to their starting point, passing above the products which arrive at said grouping station and above said structures guiding these products so as to create, with said movement means, an enveloping movement around the guide wall of these guide structures.

Still according to the invention, the grouping station comprises—guide structures in the form of an inverted T, the horizontal sections of which constitute the guide wall and—means of moving the products in the form of pushers, which pushers are, on the one hand, carried by lateral arms, which lateral arms are spaced apart by a distance greater than the length of said guide wall and, on the other hand, separated from one another by a gap sufficient to pass either side of the vertical section of said T, which distance and which gap allow these pushers to turn around said horizontal sections of said T, describing an enveloping movement, during the cycle transferring the batch of products to the pick-up station.

According to another feature of the invention, the grouping and transfer station comprises a chassis, the parallelepipedic framework of which receives, in its upper median part, a frame arranged to support the guide structures which form, with the guide walls, the different aisles, which frame is in the form of horizontal beams, situated in a plane perpendicular to said aisles, which beams include slide rails to bear said guide structures and in particular the end of the vertical section of the T.

Still according to the invention, the vertical section of the T of each guide structure is of telescopic type, which section comprises a shaft which extends downwards from the supporting frame and a U-shaped plate which supports the guide wall with, between the two, slide rails and a jack-type manoeuvring device which allows said guide wall to be raised and retracted above the level of the products in order to allow their transfer to the palletization station.

According to another feature of the invention, the frame also comprises means that allow an adjustment of the guide structures relative to one another to be carried out and in particular an adjustment of the space between them in order to adjust the width of the aisles depending on the type of product to be palletized. These means of adjusting the space between the guide structures are constituted by a screw and nut system, the screw part of which is arranged on a spindle which runs in the median part of the frame and in the upper part of each shaft of said guide structures, which shafts are grouped in threes:
—a central shaft which acts as a reference shaft and which is fixed in relation to said frame and—two side-shafts arranged on either side of said central shaft, which side-shafts each contain a nut which cooperates with said screw, the threads of which are reversed so as to simultaneously keep said side-shafts apart in relation to the central shaft.

Still according to the invention, the framework comprises, on the side, rails which are parallel to the frame and which serve as supports and guides for the carriages fitted with the pushers, which carriages are firmly attached to a single operating mechanism for scanning the whole grouping station during the transfer of the products and they comprise means for guiding and manoeuvring the arms which bear said pushers so as to be able to retract these latter above new products and the guide walls.

According to another feature of the invention, the guide structures comprise a guide wall matched to the type of product to be palletized, which wall is constituted by a beam which extends for the whole length of said grouping station, in alignment with the arrival of the products, which beam comprises, on the side which is exposed to said products, a guide rail fitted with a multitude of idler-rollers in order to facilitate the movement of said products in the aisles defined by these guide walls.

Still according to the invention, the beam of the guide structure includes a sort of cover which runs above the beam and the upper rim of the rail or rails with idler-rollers, which cover makes it possible to avoid any risk of catching the wrapping of the products, and in particular, for products of the packs type, the plastic film which holds the bottles.

BRIEF DESCRIPTION OF THE FIGURES

The invention will be explained in more detail with the help of the following description and the attached drawings, which are given for guidance and in which.

DETAIL DESCRIPTION OF NON-LIMITING EMBODIMENTS OF THE INVENTION

Figure 1:
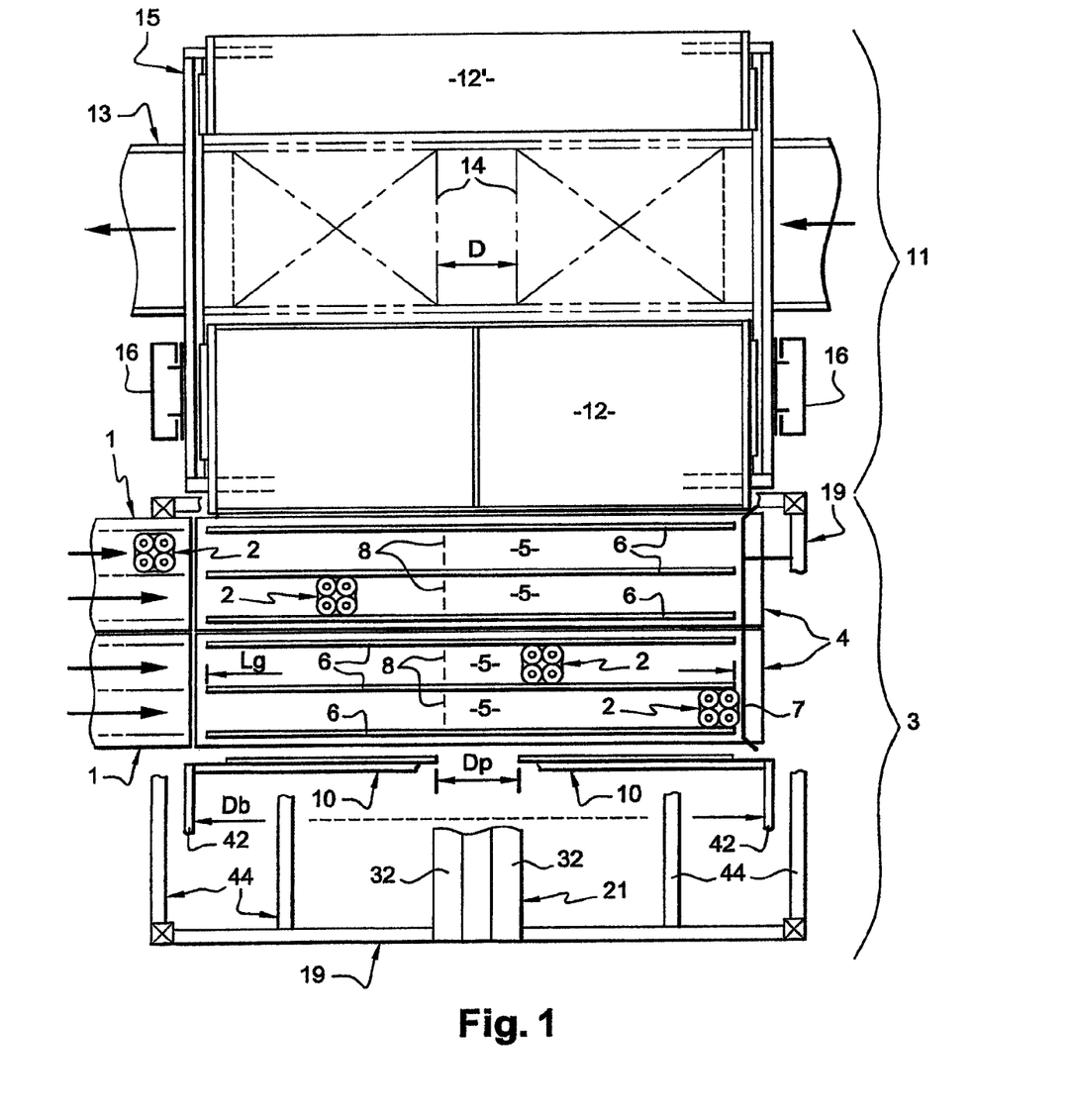
FIG. 1 is a diagrammatic plan view of a palletization installation, with the essential constituent elements, without the carriages which carry the movement means in the form of pushers.

The installation which is represented in FIG. 1 comprises two arrival lines (1) for products (2) and each line carries two rows of products. The downstream part of these lines (1) constitutes the selection station which feeds the grouping and transfer station (3), which station (3) is situated in the extension of said lines (1).

In the embodiment represented in FIG. 1, the station (3) comprises a base which is constituted by two conveyors (4) arranged downstream from the arrival lines (1). These conveyors (4) are generally constituted by motorized rollers.

The products (2) are introduced, at the station (3), on the conveyors (4) and into aisles (5) which are defined by guide walls (6). The downstream end of the aisles (5) comprises a stop (7) which extends over the whole width of the station (3).

For the installation as represented, the presence of intermediate stops (8), in the form of orientation stops, to allow the preparation of a second batch of products (2), is also seen. These stops (8) are set in their active position to stop the products (2) when the downstream part of the aisles (4) is filled with the proposed quantity of products (2) for forming a batch.

When the batch of products (2) is realized, on the base of the grouping station (3), it is moved by suitable means (10) in a direction which is perpendicular to the aisles (5), to a pick-up station (11) and in particular on the lifting table (12) of this station (11). This pick-up station (11) corresponds, for example, as represented in FIG. 1, to a palletization station at which the table (12) is of the retractable type and it operates in cooperation with a flap (12') which takes charge of half of each batch before placing the set of batches on the pallets (14).

The station (11) contains a conveyor (13) where empty pallets arrive and from where pallets leave again when loaded with layers of products (2) which are stacked on top of the other. The palletization station (11) represented in FIG. 1 allows pallets to be grouped in pairs, which has the advantage of accelerating palletization rates.

When the batch of products (2) is placed on the table (12), this table moves in order to bring said batch above the pallets (14). The batch is compacted by suitable means, not represented, before the table (12) and the flap (12') are retracted, and the (double) batch is placed on the pallets, or on the previous layers already in place, by gravity alone.

The retractable table (12) and its flap (12') are carried by a frame (15) which can move vertically, guided in uprights (16). These elements form part of the palletization station (11) which is in the form of a module combined with the grouping and transfer station (3), which station (3) is also in the form of a module.

Figures 2, 3, 4:
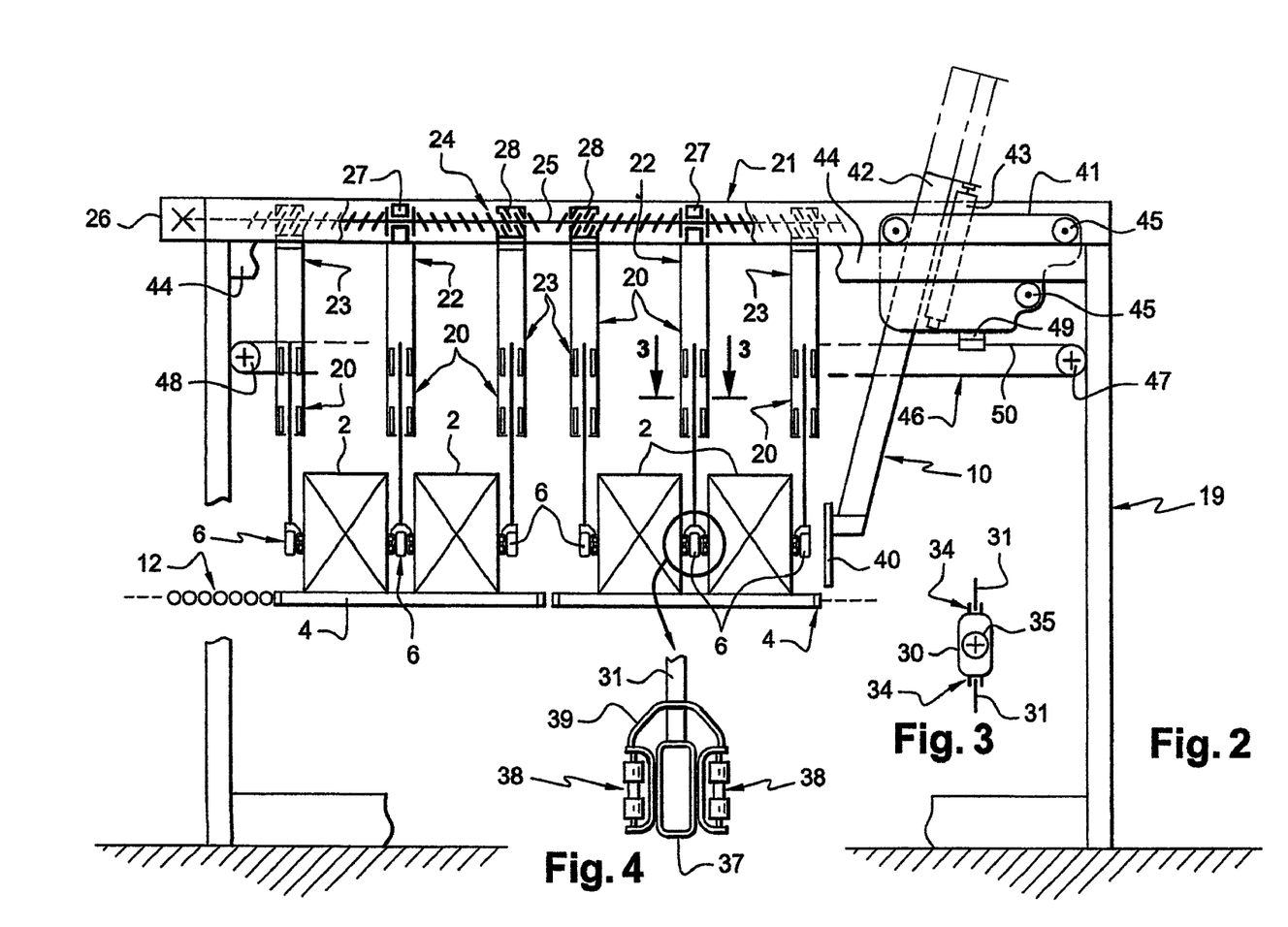
FIG. 2 is a diagrammatic elevation view of the station for the preparation and grouping of the products in four rows, which station is seen from the arrival side of said products.
FIG. 3 is a section through the shaft of one of the guide structures.
FIG. 4 represents, in greater detail, the section through a central guide wall, arranged between two aisles.
Figure 5:
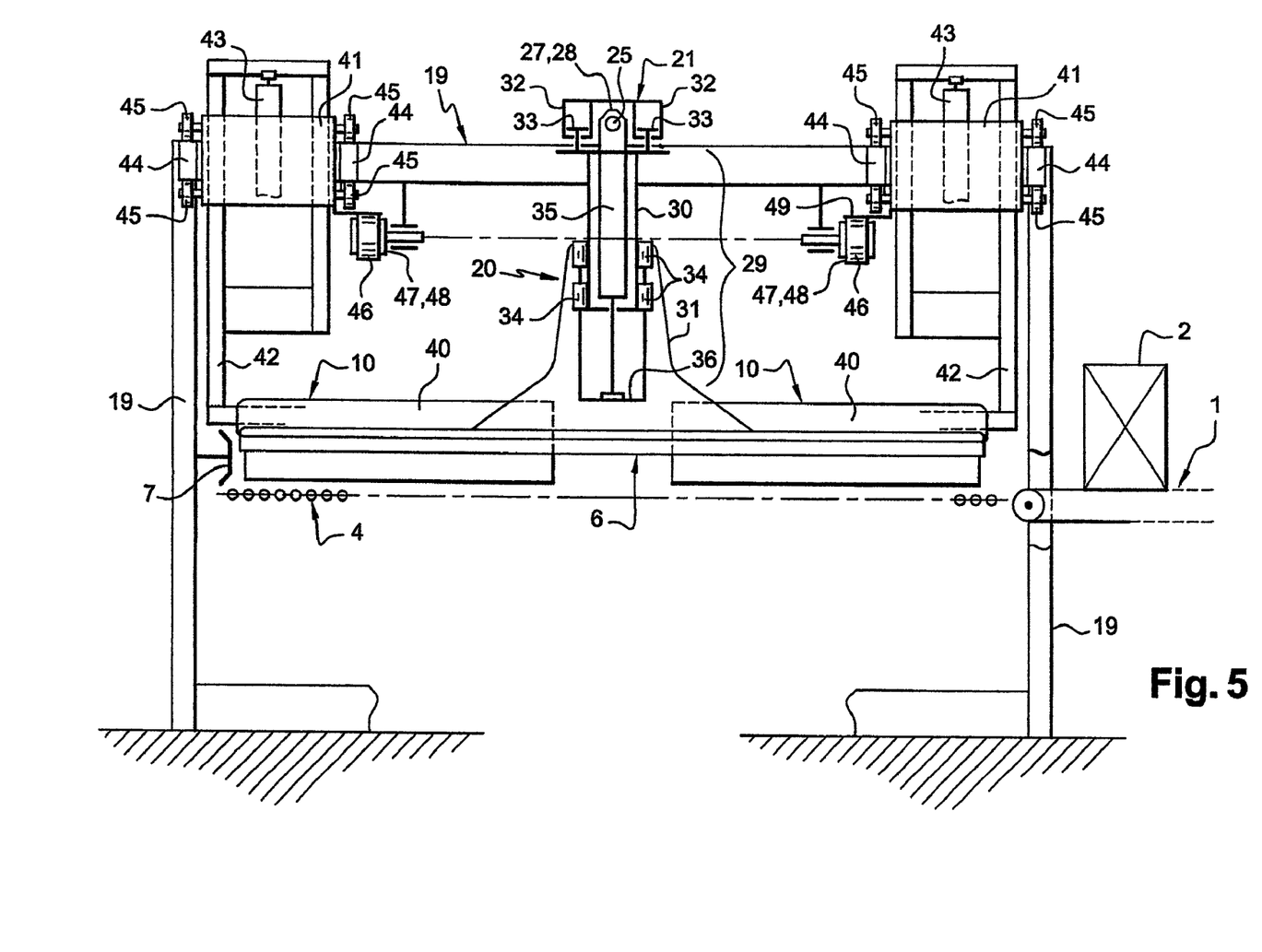
FIG. 5 shows the guide structures in their active position and the pushers in their starting position, upstream from said guide structures.

FIG. 2 and FIG. 5 show diagrammatically this grouping and transfer station (3); FIG. 2 shows it seen from the side and in particular seen from the arrival lines (1), and FIG. 5 shows it seen from the palletization station (11).

This station (3) is fashioned in the form of a module, which module is defined by a framework (19) which forms a sort of parallelepipedic cover. It contains the conveyors (4) on which the products (2) are arranged, which products are channelled by means of the guide walls (6).

These guide walls (6) form part of structures (20) which guide the products during their movement with the conveyor (4). These guide structures (20) are carried by a frame (21) in the form of a beam, which frame (21) is arranged in the upper median part of the framework (19). This frame (21) is perpendicular to the guide walls (6) and it contains means which allow the distance between the different guide structures (20) to be adjusted.

It will be noted that the guide structures (20) are grouped in threes at each conveyor (4): a central structure (22) and two side-structures (23). The central structure (22) is fixed relative to the frame (21) whereas the side-structures (23) are mobile by means of a screw and nut system (24) to modify the width of the aisles (5).

A threaded spindle (25) is housed in the frame (21); this spindle (25) is guided in rotation and it is immobilized in translation in said frame (21) and it is driven in rotation by suitable means (26), constituted, for example, by a crank or a remotely controlled motor.

The spindle (25) passes through the head of each guide structure (20); the central structures (22) can be immobilized in translation by the spindle (25) at their head (27) whereas the side-structures (23) have a head (28) in the form of a nut which cooperates with the threaded parts arranged on the spindle (25).

These threaded parts arranged on the spindle (25) constitute reverse-thread bolts so as to bring the lateral structures (23) closer or move them apart simultaneously in relation to the central structure (22).

The guide structures (20) are in the form of an inverted T, the horizontal section of which corresponds to the guide wall (6) and the vertical section (29) of which is telescopic.

This vertical section (29), FIG. 5, is constituted by a shaft (30) and a plate (31). The shaft (30) comprises, in its upper part, an arrangement constituted by a pair of sliders (32), which allows it to cooperate with horizontal slide rails (33) which form part of the frame (21); it also comprises, housed in this frame (21) and between said slide rails (33), either a head (27) which acts as a guide for the spindle (25), or a nut (28) which also cooperates with said spindle (25).

The plate (31) is in the form of a vertical U which is firmly attached to the guide wall (6). This plate (31) is mobile in relation to the shaft (30), by means of slide rails (34) arranged on each side of said shaft (30). A jack-type manoeuvring device (35) is interposed between the upper part of the shaft (30) and the bottom (36) of the plate (31). This jack (35) allows the guide wall (6) to be retracted in order to free the passage of the means (10) in the form of pushers, represented in FIG. 1, which move the batch of products (2) to the palletization station (11).

FIG. 3 shows, in section, the shaft (30) which is constituted by a profile of rectangular section. In this shaft, the jack (35) is found and, on the small external faces, the slide rails (34) which act as guides for the plate (31).

FIG. 4 shows, in greater detail, the section of a guide wall (6) which constitutes the active part of the guide structures (20) and in particular the section of a guide wall (6) of the central structure (22).

This guide wall (6) is constituted by a beam (37) which extends over the whole length of the station (3), above the conveyor (4). This beam (37) is in the form of a profile of rectangular section; it is firmly attached to the plate (31) and it comprises, on its flanks in contact with the products (2), guide rails (38) of the type with idler-rollers which allow the movement of said products to be facilitated (2).

For the guide walls (6) which form part of the structures (23), the beam (37) comprises only a single rail (38), which rail is situated on the side of the passage for the products (2).

There will also be noted, above the beam (37), a sort of cover (39) which reaches as far the upper rims of rails (38); this cover (39) makes it possible to avoid the risks of the products (2) catching on this guide wall (6), and in particular, when packs are involved, the catching of the plastic packaging film on its side crescents.

The means (10) of moving the batches of products (2) are constituted by a pair of pushers (40). Each pusher (40) is assigned to a batch of products in the case of an installation where the palletization takes place, as represented in FIG. 1, on a pair of pallets. The installation can also be of a more modest design with a single pusher and a square guide structure.

Each pusher (40) is firmly attached to a carriage (41) via an arm (42) which is vertically mobile; the carriage (41) travels laterally, in the upper part of the framework (19), and the arm (42) is guided on the carriage (41). This arm (42) is mobile under the action of a manoeuvring device constituted by a jack (43) in order to retract said pusher (40) during its return to its starting point, in its idle position, after it has transferred and released the batch of the products (2) at the palletization station (11).

The carriage (41) is carried and guided by rails (44) which form part of the framework (19). These rails (44) are parallel with the frame (21) and act as running surfaces for the rollers (45) of the carriage (41).

According to the embodiment represented in the figures, the grouping and transfer station (3) has two carriages (41). The two carriages (41) are longitudinally mobile; they are each firmly attached, for example, to an endless belt (46) of the synchronous belt type; these belts (46) are stretched between sets of pullies (47) and (48) which are mounted on shafts arranged transversely at each of the ends of the framework (19).

One of the shafts is motorized in order to drive the belts (46) and carriages (41) over the distance necessary for the transfer of the batch of products (2).

The carriages (41) each have a lug (49) which extends laterally to the upper track (50) of the corresponding belt (46), which lug (49) is fixed to said belt by any suitable means.

FIGS. 6 to 10 illustrate the different phases of the grouping method at the station (3), supplementing FIGS. 2 and 5 above.

Figure 6:
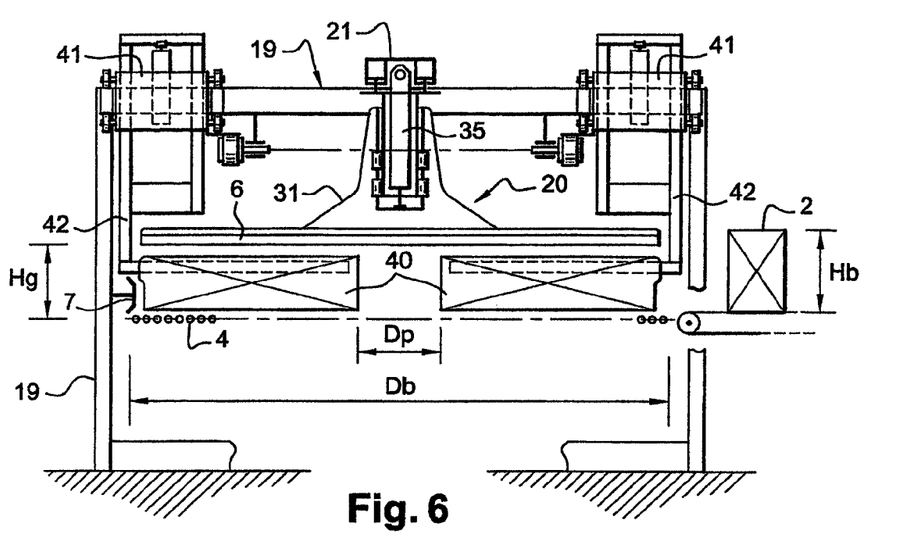
FIG. 6 represents the guide structures in their inactive position, i.e. in a position where they are retracted so as to free the passage for the pushers.

FIG. 6 amplifies FIGS. 2 and 5; it shows the guide structures (20) in their inactive position, retracted above the pushers (40). The guide walls (6) of these structures (20) are at a height Hg in relation to the conveyor (4) which is substantially of the order of the height Hb of the products (2).

Figure 10:
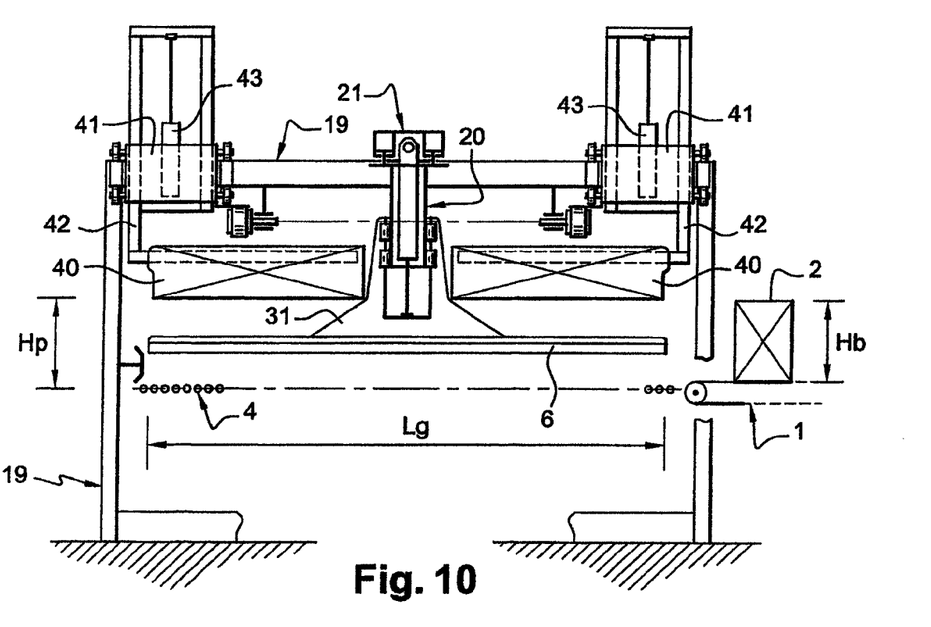
FIG. 10 shows the guide structures in their active position and the pushers in their inactive position, raised so as to pass above the guide walls.

It will also be seen in this figure that the distance Db which separates the arms (42) of each of the carriages (41) is greater than the length Lg, which can be seen in FIG. 10, of the guide walls (6) of the guide structures (20).

When the guide walls (6) free the products (2) and the passage for the pushers (40), the latter can transfer the batch of products (2), not represented in this FIG. 6, to the palletization station (11).

Figure 7:
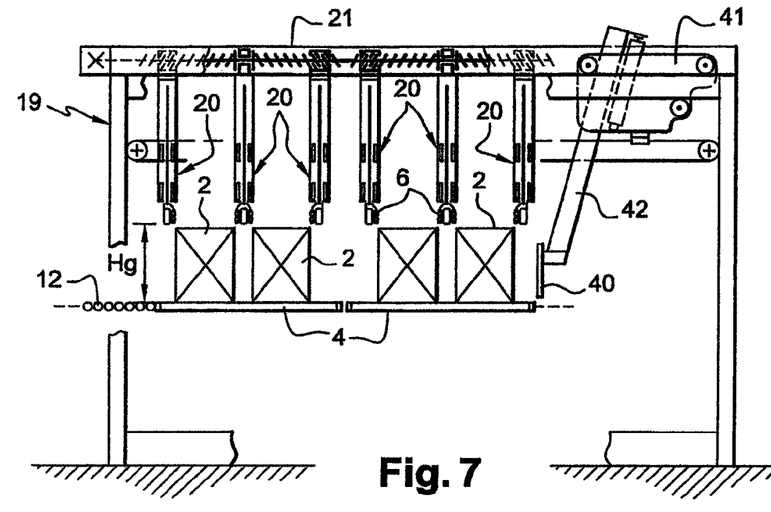
FIG. 7 represents, seen from the side, and in particular seen from the arrival point of the products, the grouping station with the different guide structures in their inactive position.

The products (2), which are ready for transfer, can be seen in FIG. 7; the batch is composed of several rows of products; these rows are slightly spaced apart and they are loaded by the pushers (40) as the latter move.

The movement of the pushers (40), i.e. their speed, can be adapted to the type of products (2) so as to control inter-row manoeuvres as they are taken in charge by said pushers (40).

Figure 8:
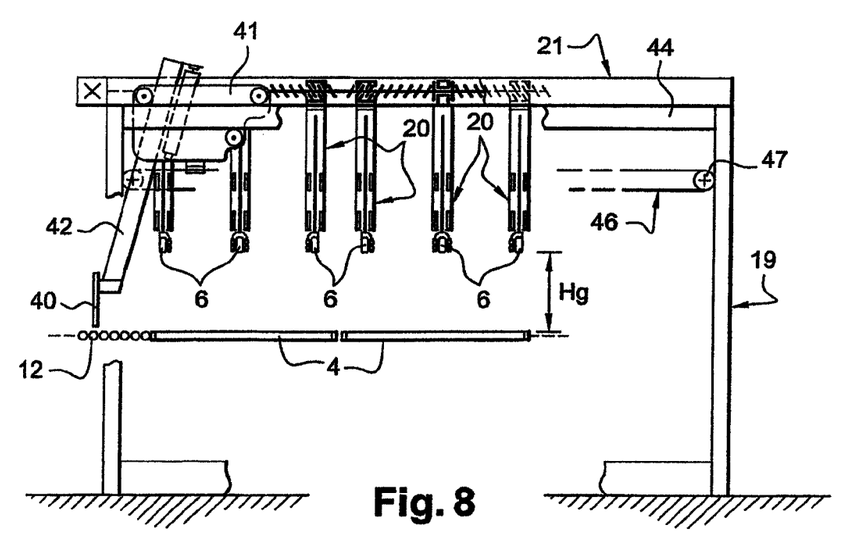
FIG. 8 represents the grouping station at the end of the transfer of the batch of products under the action of the pushers.
Figure 9:
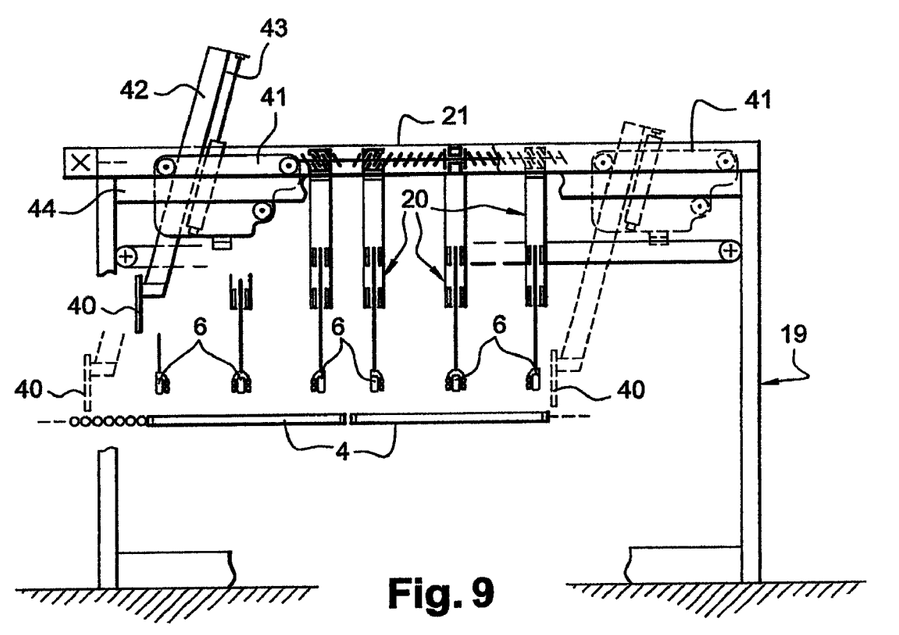
FIG. 9 represents the grouping station with the guide structures in their active position and, represented in several forms, the pushers which travel above the guide walls in order to return to their starting position.

FIG. 8 shows the pushers (40) at the end of the line, after the transfer of the batch of products (2) onto the table (12) of the palletization station (11). In this phase, the guide structures (20) are returned to their active position, as represented in FIG. 9, in order to allow the products (2) access to the grouping station (3), without waiting for the return of the pushers (40).

The pushers (40) themselves can also be retracted and can rise above the level of the guide walls (6), as represented in FIG. 10, by a height Hp which corresponds at least to the height Hb of the products (2). In this position, it will be noted that the central space between the pushers (40) is set so as not to interfere with the plate (31) of the guide structure (20). This distance Dp between the pushers (40) is also the distance D which separates two pallets (14) at the palletization station (11)

The inverted T form of the guide structures (20) and the square form of the structure of the pushers (40) allow this original combination of movements of the structures in relation to each other.

The pushers (40) are located opposite the lateral sections of the T and are spaced apart to allow the passage of the vertical central section of said T. In this way, the pushers (40) describe a sort of turning movement around the lateral sections of the T, a movement which envelops the guide walls (6).

This design of the guide structures (20) and of the structures of the pushers (40) lends itself readily to a double palletization, as represented in FIG. 1; in particular it allows very attractive speeds to be achieved for products (2) of the bottle-pack type or others.

The installation can also operate with a single pusher and square-shaped guide structures (20).

The invention claimed is:

1. A method of grouping products in batch form and of transferring said batch to a pick-up station, which method comprises: introducing said products directly at a base of a grouping and transfer station, in aisles, to form said batch, vertically retracting, once said batch is formed, guide structures forming said aisles, transferring said batch to said pick-up station by movement means in the form of pushers which pass under said guide structures, repositioning said guide structures in an active position and raising said pushers in order to bring said pushers into a starting position passing above said guide structures.

2. A grouping station for grouping and transferring products in a pick-up installation, which grouping station is arranged between a selection station of an arrival line and a table of a pick-up station, the grouping station comprising: a base comprising a motorized conveyor for carrying said products from an entrance at an upstream end of said conveyer as far as a stop system situated at a downstream end of said conveyor, guide structures for guiding said products on said conveyor and for positioning said products in several parallel rows, movement means-for moving a batch thus formed and bringing said batch onto said table, retracting means for retracting said guide structures, placing said guide structures above the level of said movement means, returning means for allowing said movement means to return to a starting point, passing above said products carried by said conveyor and above said guide structures so as to create, for said movement means, an enveloping movement around guide walls of said guide structures.

3. The grouping station according to claim 2, comprising guide structures arranged in the form of inverted T's, a horizontal section of each of which forms the guide wall and movement means for moving a batch of products which are arranged in the form of pushers, which pushers are, on the one hand, carried by lateral arms which are spaced apart by a distance greater than the length of said guide wall and, on the other hand, spaced apart from one another by a sufficient distance to pass either side of a vertical section of said T's, which distances allow said pushers to turn around said sections of said T's.

4. The grouping station according to claim 3, further comprising a substantially parallelepipedic framework which comprises, in an upper median part, a supporting frame for supporting said guide structures, which supporting frame is in the form of a horizontal beam which is arranged to carry said guides structures.

5. The grouping station according to claim 4, wherein said vertical section of said T of each guide structure is of the telescopic type, which vertical section comprises a shaft which extends downwards from said supporting frame and a U-shaped plate with, between said shaft and said U-shaped plate, slide rails and a jack-type manoeuvring device.

6. The grouping station according to claim 4, wherein said supporting frame contains adjusting means allowing an adjustment of said guide structures relative to one another including an adjustment of the space between said guide structures depending on the type of products.

7. The grouping station according to claim 4, wherein said adjusting means comprises a screw and nut system, with a screw part arranged on a spindle which runs in said supporting frame and in an upper part of each said shaft, which shafts are grouped in threes: a central shaft which acts as a reference shaft for said screw and nut system and which is fixed in relation to said supporting frame and, two side-shafts arranged on either side of said fixed shaft, which side-shafts each contain a nut which cooperates with said screw, said screw having threads which are reversed so as to simultaneously keep said side-shafts apart on either side of said central shaft, in order to match the space between said guide structures to dimensions of said products.

8. The grouping station according to claim 4, wherein said framework comprises side rails for carrying and guiding carriages on which said pushers are mounted, said carriages being firmly attached to a single movement mechanism of the type with continuous belts and comprising jack-type means for vertically manoeuvring said pushers.

9. The grouping station according to claim 3, wherein each said guide structure comprises a guide wall matched to a type of products, which guide wall is formed by a beam which extends for the whole length of said grouping station, which beam comprises, on a side exposed to said products, a guide rail fitted with a plurality of idler-rollers in order to facilitate the movement of said products between said guide walls.

10. The grouping station according to claim 9, wherein said beam of said guide structure includes a cover which runs above an upper rim of said rails with idler-rollers, which cover prevents any risk of an envelope of said products becoming caught on said guide rails.

\* \* \* \* \*